Nov. 8, 1966     H. T. M. RICE     3,283,867
CENTRIFUGAL ONE-WAY CLUTCH
Filed Oct. 19, 1964     2 Sheets-Sheet 1
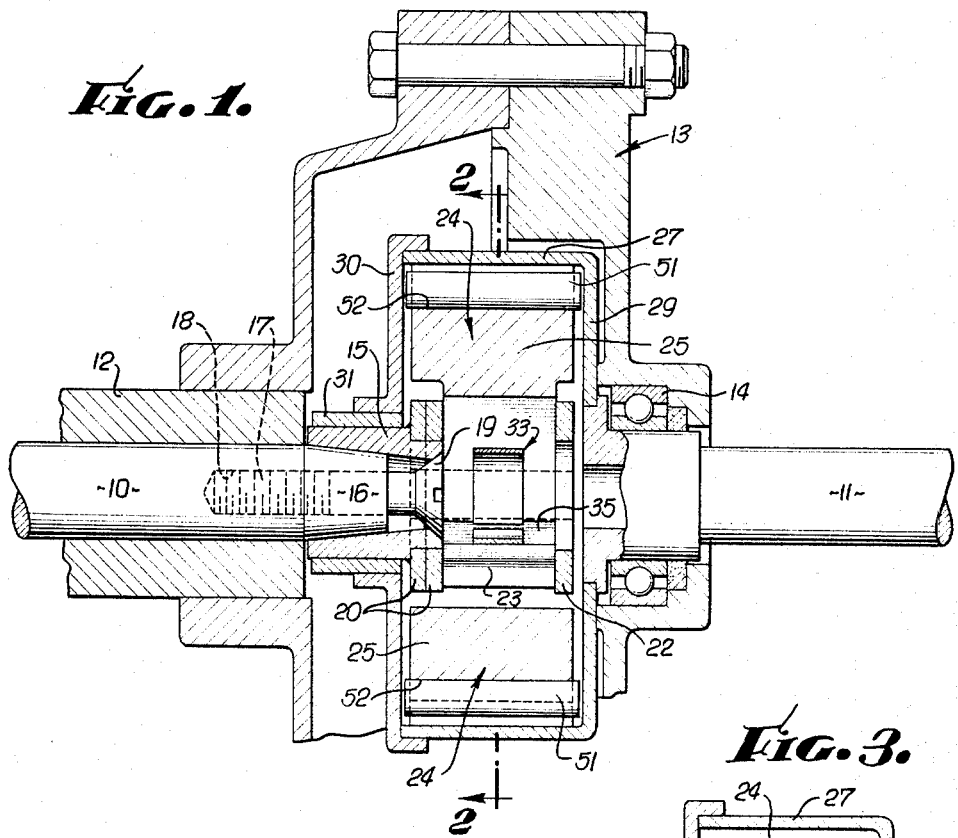
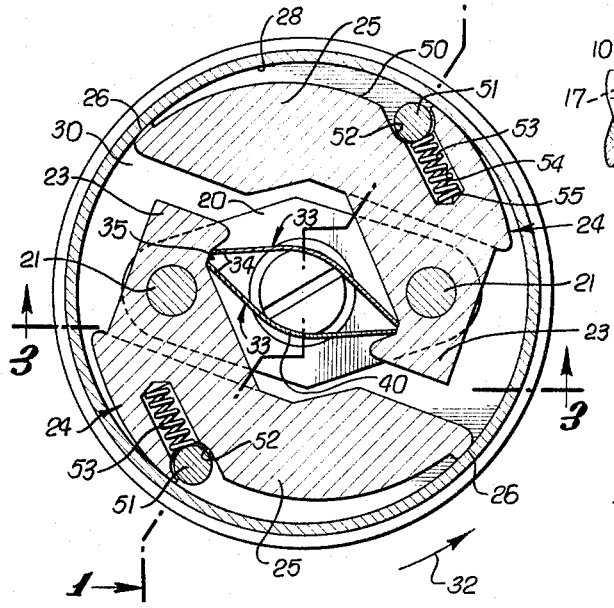
INVENTOR.
HENRY T. M. RICE
BY Bernard Kriegel
ATTORNEY.

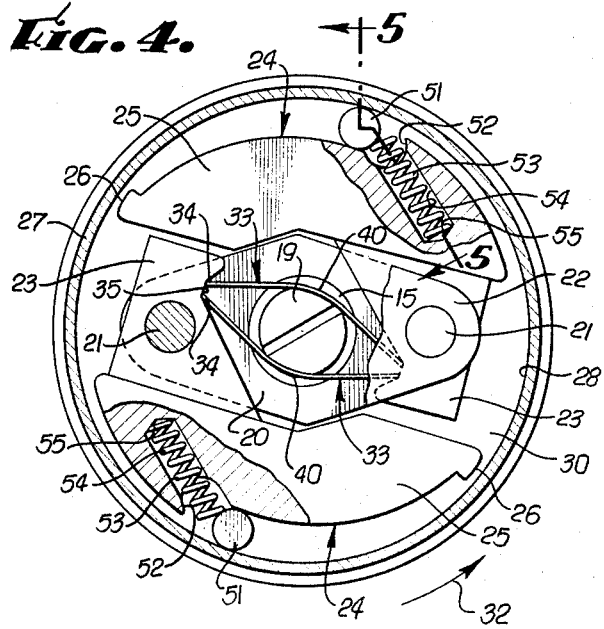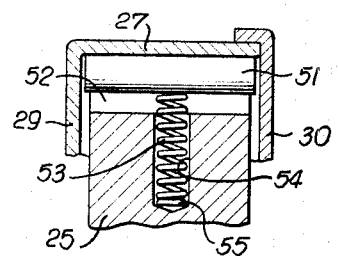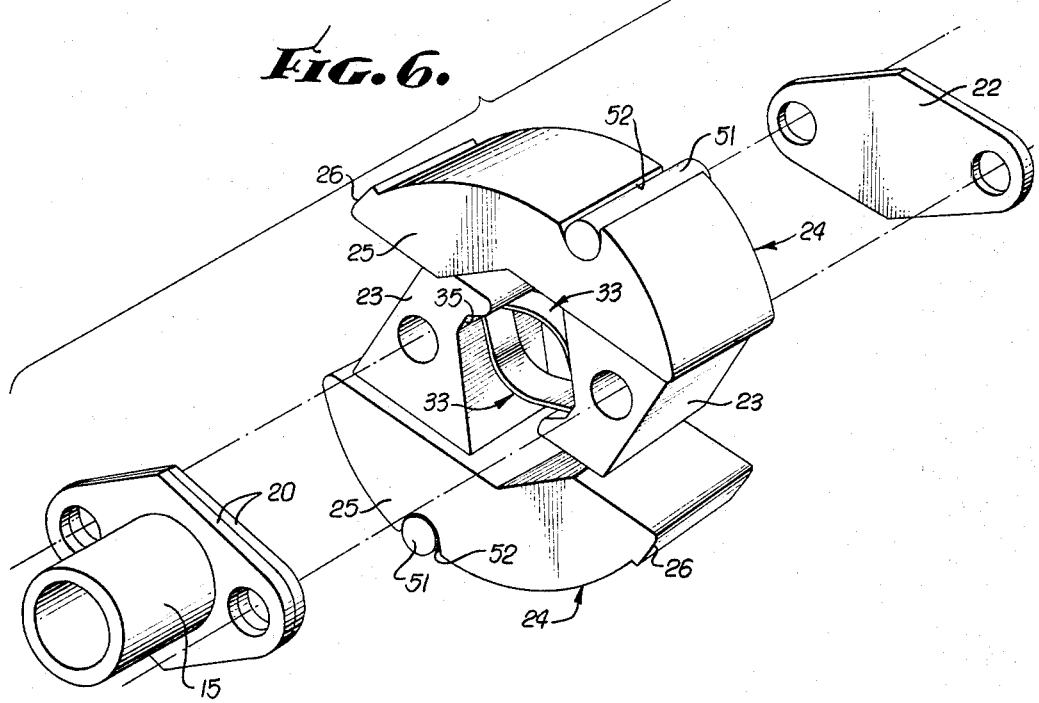

United States Patent Office 3,283,867
Patented Nov. 8, 1966

3,283,867
CENTRIFUGAL ONE-WAY CLUTCH
Henry T. M. Rice, San Gabriel, Calif., assignor to Ohlsson & Rice, Inc., Los Angeles, Calif., a corporation of California
Filed Oct. 19, 1964, Ser. No. 404,875
14 Claims. (Cl. 192—105)

The present invention relates to clutches, and more particularly to clutches of the centrifugally actuated type.

An object of the invention is to provide a combined centrifugal and one-way clutch in which the one-way clutch portion is capable of transmitting rotation from the normal driven member of the clutch to its normal driving member and of automatically unclutching when the driving member tends to overrun the driven member, the driving member then rotating the driven member through the centrifugally actuated portion of the clutch.

Another object of the invention is to provide a centrifugal clutch embodying a spring mechanism tending to retract the centrifugal clutch shoes from driving relation to the driving member, the retracting force of the spring mechanism being at a maximum when the clutch shoes are at rest and disengaged from the driven member, such retracting force decreasing as the lutch shoes are shifted centrifugally into engagement with the driven clutch member. More specifically, the decrease in the spring force can be relatively large as the clutch shoes are moved centrifugally into clutching engagement with the driven member so that a lesser centrifugal force is capable of mtaintaining the clutching engagement of the shoes with the driven member.

This invention possesses many other advantages, and has other objects which may be made more clearly apparent from a consideration of a form in which it may be embodied. This form is shown in the drawing accompanying and forming part of the present specification. It will now be described in detail, for the purpose of illustrating the general principles of the invention; but it is to be understood that such detailed description is not to be taken in a limiting sense, snce the scope of the invention is best defined by the appended claims.

Referring to the drawings:

FIGURE 1 is a longitudinal section through a centrifugal clutch embodying the invention taken along the line 1—1 on FIG. 2;

FIG. 2 is a cross-section taken along the line 2—2 on FIG. 1, showing the clutch shoes engaged with the driven member;

FIG. 3 is a section taken along the line 3—3 on FIG. 2;

FIG. 4 is a view similar to FIG. 2 illustrating the clutch shoes disengaged from the driven clutch member and the one-way portion of the clutch in effective position;

FIG. 5 is a section taken along the line 5—5 on FIG. 4;

FIG. 6 is an exploded view of the driving clutch shoe and one-way roller portions of the mechanism illustrated in FIGS. 1 to 5, inclusive.

As illustrated in the drawings, a combined centrifugal and one-way clutch is provided for transmitting rotary motion between a drive shaft 10 and a driven shaft 11. The drive shaft is rotatably mounted in a suitable bearing 12 carried in an enclosing housing or casing 13, the driven shaft 11 also extending into the housing and being rotatably mounted therein through the agency of a ball or other type of bearing 14 mounted in the outer end of the housing.

A driving clutch member or hub 15 is secured to the tapered shaft portion 16 of the drive shaft by means of a screw 17 threaded in a longitudinal bore 18 of the drive shaft, the head 19 of the screw engaging the driving member 15 to firmly wedge it onto the tapered shaft portion. Suitably secured to the driving member or hub are a pair of driving plates 20 to which are secured opposed fulcrum pins 21 extending parallel to the common axis of the drive shaft and driven shaft, the opposite ends of the pins being suitably secured to a third driving plate 22 longitudinally spaced by a substantial extent from the other drive plates 20. Pivotally mounted on the fulcrum pins 21, and disposed between the drive plates 20, 22 are the inner arm portions 23 of centrifugally actuated clutch members or shoes 24, the main body portions 25 of the shoes and their arm portions 23 being disposed on opposite sides of the fulcrum 21. The main body portion of each shoe has an external friction or drive surface 26 near its end portion remote from the arm of the shoe adapted to frictionally and positively engage the driven member or drum 27 of the clutch which encompasses the shoes. The radius of curvature of the drive surface 26 is the same as the radius of curvature of the inner surface 28 of the driven member or drum. The drum 27 has a base portion 29 normal to the axis of the driven shaft 11, which is suitably secured to the latter, and its end opposite such base portion is suitably secured to a disc 30 rotatably mounted on a bushing 31 surrounding the driving member or hub 15.

The drive shaft 10, drive member 15, and plates 20, 22 are rotated in the direction of the arrow 32 (FIG. 2), motion being transmitted through the fulcrum pins 21 to the centrifugally actuated clutch shoes 24. The centrifugal force tends to shift the shoes outwardly to bring the driving surfaces 26 into clutching engagement with the driven member or drum 27. Such outward movement of the shoe is resisted by a spring device consisting of a pair of opposed leaf springs 33 located between and extending transversely of the plates, and having their end portions 34 received within notches or pockets 35 in the arms 23 of the centrifugally actuated shoes, the point of engagement of the terminals or ends 34 of the retracting leaf springs with each arm being on the opposite side of the fulcrum pin 21 from the main body 25 of the clutch shoe. Each leaf spring 33 is bowed slightly and inherently tends to straighten, urging the arms 23 of the shoes outwardly of the axis of the clutch mechanism, and correspondingly tending to shift the main bodies 25 of the clutch shoes inwardly to disengage their drive surfaces 26 from the inner cylindrical surface 28 of the driven member or drum 27.

As the main bodies 25 of the shoes move outwardly under the action of centrifugal force, their arm portions 23 move inwardly toward each other, increasing the extent of bow of each of the opposed springs 33. Such increase in the extent of bow on each spring decreases the force which it exerts on the arms 23 tending to move them outwardly and the main bodies of the shoes inwardly, since the moment arm of each leaf spring from its mid-point 40 increases, thereby enabling the spring to be deflected, or its bow increased, with lesser force. Thus, each leaf spring 33 can be deflected to a greater extent as a result of a lesser additional force exerted thereon as the ends of each spring are moved toward each other, the spring exerting its maximum force or resistance to deflection as it approaches a straight condition. Accordingly, when the clutch shoes 25 are in a state of rest, disengaged from the driven clutch member 27, there is a maximum retracting force acting on them tending to resist their outward movement. As the speed of the drive shaft 10, drive member 15, 20, 22, and clutch shoes 24 increases, the centrifugal force will eventually overcome the resisting force of the leaf springs, the body portions 25 of the shoes moving outwardly to deflect the springs, the spring force progressively decreasing until the drive surfaces 26 of the shoes engage the driven member or drum 27. Thus, the centrifugal force holds the shoes in clutching engagement with the driven member or drum against a lesser spring force resistance than is encountered when the clutch shoes are in their ineffective and fully retracted positions.

As the speed of the driving members and shoes decreases to a predetermined value, the retracting leaf springs 33 will disengage the clutch shoes 24 from the drum 27, the disengaging force increasing as the shoe arms 23 move laterally away from each other and the distance between the ends 34 of each spring increases, the shifting of the shoes to their fully unclutched and retracted position being accelerated. Conversely, as the speed of the drive portion of the clutch increases, the centrifugal force acting on the clutch shoes will eventually overcome the initial and maximum resisting force of the springs, outward movement of the shoes 24 being accelerated as the springs are bowed to a greater extent, because of the decrease in the resistance offered by the springs as the extent of their bowing increases.

The clutch mechanism illustrated is a combination of a centrifugal clutch and a one-way clutch. It is capable of transmitting turning effort from the driven member or drum 27 to the drive member 15 through the clutch shoes 24, the one-way clutch portion of the apparatus automatically disconnecting when the driving portions of the clutch overrun its driven portions. However, the one-way clutch illustrated is only effective when the clutch shoes 24 are in their retracted or disengaged position.

As specifically illustrated in the drawings, the main body portion 25 of each shoe has an external cam or tapered surface 50 that tapers outwardly toward the inner surface 28 of the driven member or drum 27 in the direction toward the drive surface 26 of each shoe. That is, the distance between the cam surface 50 and the inner surface 28 of the drum progressively decreases in the direction of rotation of the clutch mechanism. A wedging roller 51 is carried in each shoe in a pocket 52 at the trailing end of its cam surface 50, as regards the direction of rotation of the clutch. The one-way roller 51 is urged outwardly into engagement with the inner surface 28 of the drum by a light helical compression spring 53 disposed in a shoe socket 54, the inner end of the spring engaging the base 55 of the socket and its outer end engaging the roller 51 and tending to urge the latter laterally outwardly.

The clutch element or roller 51 has a diameter which is greater than the maximum distance between the cam surface 50 and the inner surface 28 of the driven member or drum 27 when the driving surfaces 26 of the clutch shoes are in engagement with the inner surface of the drum. Such condition is illustrated in FIG. 2, in which each spring 53 cannot shift its associated roller 51 into a wedging relation between the inner surface 28 of the drum and the cam surface 50. As previously stated, such shifting into wedging relation cannot occur since the distance between the cam surface and the inner surface of the drum is less than the diameter of the roller. However, when the clutch shoes 24 are in their fully retracted position, such as illustrated in FIG. 4, the cam surface 50 on each shoe has moved inwardly away from the inner surface 28 of the drum or driven member to an extent such that the distance between the cam surface 50 adjacent to the roller 51 and the surface 28 of the driven member is greater than the diameter of the roller 51. Accordingly, each spring 53 can then shift its companion roller into wedging engagement between the drum 27 and the clutch shoe 24. If the spring 53 were omitted, the roller 51 could gravitate into wedging relation between the cam surface 50 and drum surface 28.

With the parts in the condition of rest illustrated in FIG. 4, the rotation of the driven member 27 in the normal driving direction of the driving shaft 10 and drive member 15, 20, 22 will cause each roller 51 to wedge between the cam surface 50 of its companion shoe and the drum surface 28 and move the shoe, the extent of inward movement of the shoe being limited by its engagement with the drive plates 20, 22. The transmission of motion continues from the shoes 24 to the fulcrum pins 21, and to the drive plates 20, 22, driving member 15 and drive shaft 10. Thus, the rotary motion of the driven member 27 is transmitted through the one-way clutch portion of the mechanism to the drive shaft 10.

In one example of use of the clutch mechanism, the drive shaft 10 may be the crankshaft of an internal combustion engine. When the engine starts, as a result of turning the crankshaft 10 through the exertion of a turning effort on the driven shaft 11 and drum 27, the drive shaft 10, and driving member, plates 20, 22, and shoes 24 will rotate faster than the driven member 27, causing the shoes to overrun the driven member and allowing the rollers 51 to drop back into their pockets 52 free from clutching relation between the inner surface 28 of the drum and the cam surfaces 50 of the shoes. As the speed of the drive shaft and its associated driving members and clutch shoes increases, the clutch shoes 24 will shift outwardly into clutching engagement with the drum, as disclosed in FIG. 2. It is only when the clutch shoes are substantially in a state of rest, as disclosed in FIG. 4, that the one-way rollers 51 can be shifted into a clutching relation between the driven drum and the cam surfaces of the shoes.

I claim:

1. In a clutch: a driving member; a driven member having a clutching surface; a clutch member rotatable by said driving member and movable by centrifugal force into engagement with said clutching surface of said driven member; and one-way clutch means acting between said clutch member and said clutching surface of said driven member for transmitting rotation in one direction from said driven member through said clutch member to said driving member.

2. In a clutch: a driving member; a driven member having an internal surface; a clutch member rotatable by said driving member and movable outwardly by centrifugal force into clutching engagement with said internal surface; and overrunning clutch means acting between said clutch member and internal surface for transmitting rotation in one direction from said driven member through said clutch member to said driving member.

3. In a clutch: a driving member; a driven member having a clutching surface; a clutch member rotatable by said driving member and movable by centrifugal force into engagement with said clutching surface of said driven member, said clutch member having a cam surface; and a clutch element adapted to be wedged between said cam surface and said clutching surface of said driven member for transmitting rotation in one direction from said driven member through said element and clutch member to said driving member.

4. In a clutch: a driving member; a driven member having an internal surface; a clutch member rotatable by said driving member and movable outwardly by centrifugal force into clutching engagement with said internal surface, said clutch member having an external cam surface; and a clutch element adapted to be wedged between said cam surface and internal surface to transmit rotation in one direction from said driven member through said element and clutch member to said driving member.

5. In a clutch: a driving member; a driven member; a clutch member rotatable by said driving member and movable by centrifugal force into engagement with said driven member, said clutch member having a cam surface; and a clutch element adapted to be wedged between said cam surface and driven member for transmitting rotation in one direction from said driven member through said element and clutch member to said driving member; the distance across said element being greater than the distance between said cam surface and driven member when said clutch member engages said driven member to prevent said element from moving between said cam surface and driven member.

6. In a clutch: a driving member; a driven member having an internal surface; a clutch member rotatable by said driving member and movable outwardly by centrifugal force into clutching engagement with said internal surface, said clutch member having an external cam surface; and a clutch element adapted to be wedged between said cam surface and internal surface to transmit rotation in one direction from said driven member through said element and clutch member to said driving member; the distance across said element being greater than the distance between said external cam surface and internal surface when said clutch member engages said internal surface to prevent said element from moving between said cam surface and internal surface.

7. In a clutch: a driving member; a driven member having a clutching surface; a clutch member rotatable by said driving member and movable by centrifugal force into engagement with said clutching surface of said driven member, said clutch member having a cam surface and a pocket at the trailing end of said cam surface; and a rollable clutch element normally disposed in said pocket and adapted to be wedged between said cam surface and said clutching surface of said driven member for transmitting rotation in one direction from said driven member through said element and clutch member to said driving member.

8. In a clutch: a driving member; a driven member having an internal surface; a clutch member rotatable by said driving member and movable outwardly by centrifugal force into clutching engagement with said internal surface, said clutch member having an external cam surface and a pocket at the trailing end of said cam surface; and a rollable clutch element normally disposed in said pocket and adapted to be wedged between said cam surface and internal surface to transmit rotation in one direction from said driven member through said element and clutch member to said driving member.

9. In a clutch: a driving member; a driven member having an internal surface; a clutch member rotatable by said driving member and movable outwardly by centrifugal force into clutching engagement with said internal surface, said clutch member having an external cam surface and a pocket at the trailing end of said cam surface; and a rollable clutch element normally disposed in said pocket and adapted to be wedged between said cam surface and internal surface to transmit rotation in one direction from said driven member through said element and clutch member to said driving member; the diameter of said rollable element being greater than the distance between said cam surface and internal surface when said clutch member engages said internal surface to retain said rollable clutch element in said pocket and prevent it from moving between said cam surface and internal surface.

10. In a clutch: a driving member; a driven member; a clutch member rotatable by said driving member and movable by centrifugal force into engagement with said driven member; and spring means engaging said clutch member to retract it from engagement with said driven member, said spring means comprising a slightly bowed leaf spring having an end portion engaging said clutch member in such manner that said clutch member imposes a force on said leaf spring predominantly longitudinally of said spring to increase its bowed height as the clutch member moves into engagement with said driven member.

11. In a clutch: a driving member; a driven member; clutch members rotatable by said driving member and movable by centrifugal force into engagement with said driven member; and a slightly bowed leaf spring having opposed end portions engaging said clutch members and tending to retract said clutch members from engagement with said driven member; said clutch members and spring being so related to each other that said clutch members impose a force on said leaf spring predominantly longitudinally of said spring to increase its bowed height as the clutch members move into engagement with said driven member.

12. In a clutch: a driving member; a driven member; clutch members pivotally carried by said driving member and having body portions on one side of their pivotal axes movable by centrifugal force into engagement with said driven member and arm portions on the other side of their pivotal axes; and a slightly bowed leaf spring having end portions engaging said arm portions and tending to force said arm portions away from each other to retract said body portions from said driven member; said arm portions and spring being so related to each other that said arm portions impose a force on said leaf spring predominantly longitudinally of said spring to increase its bowed height as the body portions move into engagement with said driven member.

13. In a clutch: a driving member; a driven member having an internal surface; clutch members pivotally carried by said driving member and having body portions on one side of their pivotal axes movable outwardly by centrifugal force into engagement with said driven member and having arm portions on the other side of their pivotal axes; and a slightly bowed leaf spring having end portions engaging said arm portions and tending to force said arm portions away from each other to retract said body portions from said driven member, said leaf spring engaging said arm portions in such manner that outward movement of said body portions move said arm portions inwardly toward each other and against the ends of said spring to impose a force on said spring predominantly longitudinally of said spring and to shift said ends toward each other and increase the bowed height of said spring.

14. In a clutch: a driving member; a driven member having an internal surface; clutch members pivotally carried by said driving member and having body portions on one side of their pivotal axes movable outwardly by centrifugal force into engagement with said driven member and having arm portions on the other side of their pivotal axes; a leaf spring having end portions engaging said arm portions and tending to force said arm portions away from each other to retract said body portions from said driven member, said leaf spring engaging said arm portions in such manner that outward movement of said body portions move said arm portions inwardly toward each other and against the ends of said spring to shift said ends toward each other and increase the bowed height of said spring; said body portions having external cam surfaces and pockets at the trailing ends of said cam surfaces; and rollable clutch elements normally disposed in said pockets and adapted to be wedged between said cam surfaces and internal surface to transmit rotation in one direction from said driven member through said elements and clutch members to said driving member; the diameter of each element being greater than the distance between its associated cam surface and internal surface when said body portions engage said driven member to prevent said elements from moving from said pockets into positions between said cam surfaces and internal surface.

References Cited by the Examiner
UNITED STATES PATENTS

| | | | |
|---|---|---|---|
| 1,958,884 | 5/1934 | Bonanno | 192—105 X |
| 2,529,919 | 11/1950 | Cunningham | 192—48 |
| 2,663,397 | 12/1953 | Scott | 192—48 X |
| 2,916,119 | 12/1959 | Haan et al. | 192—105 X |

DAVID J. WILLIAMOWSKY, *Primary Examiner.*

B. W. WYCHE III, *Assistant Examiner.*